3,023,248
PRODUCTION OF ORGANOBORANES
Eugene C. Ashby, Baton Rouge, La., assignor to Ethyl Corporation, New York, N.Y., a corporation of Delaware
No Drawing. Filed Apr. 6, 1959, Ser. No. 804,078
6 Claims. (Cl. 260—606.5)

This invention is concerned with the production of organoboron compounds, particularly trialkyl boranes.

There have been many methods described in the prior art for the production of organoboron compounds included among which are the reaction of diborane with olefins, the Grignard reagent with boron trifluoride, and certain borate esters with alkyl aluminum halides. All of such processes suffer certain disadvantages which have limited their applicability to commercial employment.

The alkyl boron compounds are of considerable utility and becoming even more important. For example, they are useful, in the form of amine addition products, as diesel additives. They are also useful toward forming polymerization catalysts for polymerizing olefins such as acrylonitrile. They can also be employed for the production of alcohols by oxidation and hydrolysis. It is anticipated that improved methods for producing these compounds will result in still further uses than are presently known.

Accordingly, an object of this invention is to provide a new and novel process for the production of organoboron compounds. Another object is to provide a process for producing organoboron compounds in higher yield and purity than heretofore obtainable. A still further object is to provide a method for obtaining organoboron compounds which is more economical than those previously available. These and other objects of this invention will be apparent as the discussion proceeds.

It has now been found that organoboranes can be readily produced by reacting an organooxy boroxine, $(ROBO)_3$, with an organo aluminum compound. The reaction proceeds very readily even at room temperature to result in quantitative yields. The alkoxy boroxines, particularly trimethoxyboroxine, are particularly suitable boroxines. The trialkyl aluminum compounds, especially triethyl aluminum, are preferred organoaluminum compounds. Particular advantage is achieved when the reaction is performed at between about 20 to 50° C. employing between about 3 to 4 moles of the organoaluminum compound per mole of the organooxy boroxine. Thus, a particularly preferred embodiment is the reaction of one mole trimethoxyboroxine with between about 3 to 4 moles of triethylaluminum at a temperature between about 20 to 50° C.

The process of this invention is of particular advantage in that the reaction is essentially instantaneous and quantitative yields are readily obtainable. Another advantage of the process is that it permits the use of very economical starting materials. Heretofore, the boron reactants employed have been quite costly and, further, contained a greater proportion of chemical constituents in the material that required additional reactor space consumption. The organooxy boroxine is readily prepared by merely adding boric oxide to an appropriate borate ester in proportions between about 1 to 2 moles of boric oxide per mole of borate ester and reacting at temperatures up to 400° C. and higher. Both of these materials are readily available and economical. Further this reaction proceeds in rapid quantitative yield. A still further advantage of the novel process is that all of the boron employed as starting material is consumed in formation of the desired organoboron compound forming this material in a state which is readily recovered in pure form. Likewise, the process is of additional advantage in that a by-product aluminum alcoholate is produced which can be readily converted to the borate esters employed in forming the organooxy boroxine. Thus, while boric oxide does not react with aluminum alkyls in appreciable yields, the present invention is of advantage in providing a practical method which resolves itself to the quantitative reaction of boric oxide with an organo aluminum compound.

In general, any organooxy boroxine, $(ROBO)_3$, can be employed in the process of this invention. A number of such materials are presently commercially available. Typical examples of such include trimethoxy boroxine, triethoxy boroxine and the corresponding boroxines wherein the hydrocarbon portions are octyl, octadecyl, tricosyl, vinyl, propenyl, cyclohexyl, 1-hexynyl, phenyl, naphthyl and the like hydrocarbon radicals. It is to be understood that such hydrocarbon groups can be further substituted provided such substituents are essentially inert in the reaction. It is desirable to employ such organooxy boroxines which are liquid or soluble in the reaction system. In general, such materials will contain up to and including about 30 carbon atoms although alkoxy boroxines wherein the alkyl groups contain up to and including about 8 carbon atoms, especially the ethyl and methyl groups, are preferred because of their greater availability and economy.

The organoaluminum compounds employed as reactants are very well known and, in general, have at least one aluminum to carbon linkage. Typical examples of such compounds include trimethyl, triethyl, tripropyl, tributyl, triisobutyl, trioctyl, trieicosyl, tri-tricosyl, tripropenyl, trihexenyl, tricyclopentyl, tricyclohexyl, tri-1-hexynyl, tribenzyl, triphenyl, trinaphthyl, dimethylethyl, and diethylmethyl aluminum and the like organo aluminum compounds including such materials as diethylaluminum chloride, bromide, iodide, or fluoride; ethyl aluminum dichloride; diethylaluminum hydride, and the like. In general, such compounds will contain up to about 30 carbon atoms and higher in the hydrocarbon portions and such can be further substituted with organic substituents which are essentially inert in the principal reaction. The trihydrocarbon aluminum compounds are particularly preferred, especially those which are liquid under the reaction conditions and in which the hydrocarbon groups are alkyl having up to and including about 8 carbon atoms. A particularly preferred organoaluminum reactant is triethylaluminum.

The relative portions of the organooxy boroxine and organoaluminum reactants can be varied widely in order to achieve the desired results. Ordinarily, between about 1 to 5 moles of the organoaluminum compound per mole of the organooxy boroxine are employed. It is preferable, however, for more economical and beneficial results, to employ between about 3 to 4 moles of the organoaluminum compound per mole of the organooxy boroxine.

The reaction proceeds very rapidly over a wide range of temperature conditions and is exothermic. For example, temperatures as low as −50° C. up to the decomposition temperature of the reactants or products are employable. It has been found that the best results are obtained when the temperature is maintained between about 20 to 50° C. employing cooling as necessary. There is no necessity for pressure operation and the length of reaction, being instantaneous, is dictated primarily by the rate of addition of the reactants and heat removal.

The operational techniques employed in conducting the process involve merely the addition of the organoaluminum reactant to the organooxy boroxine or the reverse addition is equally applicable. The reaction temperature is controlled generally by the heat removal facilities employed in order to maintain the desired temperature. Additionally, the usual organic diluents, as well be brought borth more fully hereinafter, can be used in order to assist in heat control. At the completion of the reaction the organoborane is readily removed from the reaction system by simple distillation. The aluminum oxide by-product is then removed by filtration and the aluminum alkoxide by-product is hydrolyzed to release the alcohol residue which can then be reacted with boric acid, boric oxide, or borax and sulfuric acid to produce the borate ester. The organooxy boroxine is then readily prepared by reacting boric oxide with the borate ester as mentioned previously.

The invention will be further understood by reference to the following examples wherein all parts are by weight.

Example I

To a reactor equipped with internal agitation and a means for external cooling was added 68.4 parts of triethylaluminum. Then, at room temperature, 34.8 parts of trimethoxyboroxine was slowly added. The temperature of the reaction mixture rose to 80° C. during the addition and then air cooling was commenced to maintain this temperature. At the completion of the additon, a total addition period of 60 minutes, the resulting solution was distilled leaving a white residue. The distillate was then fractionally distilled, the entire distillate boiling from 92 to 95° C. with 95 percent of it boiling at 95° C. The yield of triethylborane obtained in this manner was 70 percent.

Example II

Employing the reactor of Example I except that dry ice cooling was maintained, 173.6 parts of trimethoxyboroxine, prepared by reacting 70 parts of boric oxide to 104 parts of trimethyl borate at 180° C. for 6 hours was added to the reactor, then 342 parts of triethylaluminum dissolved in 100 parts of mineral oil were added over a period of 2 hours while maintaining constant agitation. Finely divided solids which formed during the reaction were dispersed as a slurry in the mineral oil. The reaction mixture at the completion of the addition of the aluminum triethyl was fractionally distilled to remove the triethylborane. At 94 to 95° C., 259 parts of triethylborane were obtained representing a yield of 88 percent.

Example III

Employing the procedure of Example I, 160 parts of ethyl aluminum sesquihalide, a mixture of diethylaluminum chloride and ethyl aluminum dichloride, dissolved in 150 parts of mineral oil ("Bayol D") was placed in the reactor and then 35 parts of trimethoxy boroxine was added over a period of 3 hours. At the end of this period, the product was distilled from the reactor at a temperature of 92 to 95° C. and then the distillate was again subjected to fractional distillation. The product recovered boiling at 94 to 95° C. amounted to 54 parts, representing a yield of 91.2 percent.

Example IV

When Example I is repeated with exception that 216 parts of triethoxy boroxine are reacted with 1098 parts of trioctyl aluminum at 50° C. employing an addition period of 45 minutes, trioctylborane is obtained in high yield.

Example V

Trieicosylborane is produced in essentially quantitative yield when triphenoxy boroxine is reacted with a 10 percent excess of trieicosyl aluminum at 100° C.

Example VI

When Example II is repeated substituting diethyl ether, dimethylether of diethylene glycol, tetrahydrofuran, dioxane, dimethyl ether of triethylene glycol, triethylamine, myristyldimethylamine, pyridine, or dimethyl aniline for mineral oil, equally satisfactory yields of triethylborane are obtained.

Example VIII

Employing the procedure of Example II, 1032 parts of triphenyl aluminum are reacted with 209 parts of trimethoxy boroxine, which is obtained by reacting 1½ moles of boric oxide with 1 mole of methyl borate at 180° C. Triphenyl borane is obtained in high yield.

The above examples are presented by way of illustration and are not intended to be limitations of the present invention. It will be evident that other boroxines and organoaluminum compounds described hereinbefore can be substituted in the above examples to produce equally satisfactory results.

While there is no necessity to employ a solvent in conducting the process of this invention, such are frequently to advantage in exercising control of the reaction temperature or as solvents when one or both of the reactants are solid. The general criteria for such solvents are that they be liquid under the reaction conditions, essentially inert in the reaction other than complexing with the reactants or product, and readily recoverable from the reaction system. Among such solvents are included the organic hydrocarbons, ethers, and tertiary amines. Typical examples of such materials include the hexanes, nonanes, decanes, benzene, toluene, xylene, various mineral oils, gasoline, diesel fuel, catalytically cracked naphtha, dimethyl ether, diethyl ether, dibutyl ether, diamyl ether, methyl ethyl ether, dicyclopentyl ether, dimethyl ether of diethylene glycol, diethyl ether of diethylene glycol and the like ethers of glycols; diphenyl ether, dibenzyl ether, dioxane, tetrahydrofuran, trimethylamine, triethylamine, tributylamine, triphenylamine, pyridine, dimethyl aniline and the like hydrocarbons, ethers and amines. In general, such diluents will contain up to and including about 20 carbon atoms in the hydrocarbon moities. The liquid hydrocarbons particularly those having up to and including about 10 carbon atoms are especially preferred.

The principal reaction of the boroxine with the organoaluminum compound is well suited to an integrated process whereby the aluminum alcoholate by-product is treated to recover the alcohol value which in turn is reacted to form the borate ester which is then reacted to form the boroxine. A particular embodiment after separation of the organoborane and solvent, if employed, is to treat the residue under hydrolysis conditions to form the alcohol which is recovered and then reacted with boric oxide, boric acid or borax and sulfuric acid to form the corresponding borate ester. Then boric oxide is reacted with the borate ester to form the boroxine. The following example will demonstrate such an integrated process.

Example VIII

Example I is repeated. At the completion of the reaction the reaction mixture is subjected to distillation as indicated to remove the organoborane. To the residue is added water containing a minor amount of dilute hydrochloric acid. The resultant mixture is filtered to remove solids and subjected to distillation to recover the alcohol. The recovered alcohol is then reacted with borax in the presence of sulfuric acid to produce trimethyl borate. Upon filtering the resultant mixture, boric oxide is added to the methyl borate and heated to 180° C. for 5 hours to form the trimethoxy boroxine.

Having thus described the process of this invention, it is not intended that it be limited except as set forth in the following claims.

I claim:

1. A process for the manufacture of a hydrocarbon boron compound which comprises reacting a hydrocarbon oxy boroxine, $(ROBO)_3$, wherein the hydrocarbon groups contain up to and including about 30 carbon atoms with a hydrocarbon aluminum compound wherein the hydrocarbon groups contain up to and including about 30 carbon atoms.

2. The process of claim 1 further characterized in that the hydrocarbon groups of said hydrocarbon oxy boroxine and said hydrocarbon aluminum compound are alkyl groups.

3. The process of claim 1 wherein the reaction is conducted between about 20 to 50° C.

4. A process for the manufacture of triethylborane which comprises reacting trimethoxy boroxine with triethylaluminum at a temperature between about 20 to 50° C.

5. The process of claim 4 further characterized in that between about 3 to 4 moles of said trimethylaluminum are employed per mole of said trimethoxyboroxine.

6. The process of claim 1 further characterized in that the hydrocarbon groups of said hydrocarbon oxy boroxine and said hydrocarbon aluminum compound are alkyl groups containing up to 8 carbon atoms each, and in that the reaction is carried out in an essentially inert solvent.

References Cited in the file of this patent

UNITED STATES PATENTS 2,853,526  Perrine _____ Sept. 23, 1958

UNITED STATES PATENT OFFICE
CERTIFICATE OF CORRECTION

Patent No. 3,023,248                          February 27, 1962

Eugene C. Ashby

It is hereby certified that error appears in the above numbered patent requiring correction and that the said Letters Patent should read as corrected below.

Column 2, line 67, for "techniquesem ployed" read -- techniques employed --; column 3, line 1, for "well" read -- will --; line 2, for "borth" read -- forth --; column 4, line 3, for the heading, "Example VIII", in italics, read -- Example VII --, in italics; column 6, line 1, for "trimethylaluminum" read -- triethylaluminum --.

Signed and sealed this 26th day of June 1962.

(SEAL)
Attest:

ERNEST W. SWIDER
Attesting Officer

DAVID L. LADD
Commissioner of Patents